(12) United States Patent
Inoue et al.

(10) Patent No.: US 6,682,213 B2
(45) Date of Patent: Jan. 27, 2004

(54) TWIN-SCREW CONTINUOUS KNEADING APPARATUS AND KNEADING METHOD USING THE SAME

(75) Inventors: Kimio Inoue, Kobe (JP); Koichi Miyake, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 190 days.

(21) Appl. No.: 10/032,555

(22) Filed: Jan. 2, 2002

(65) Prior Publication Data

US 2002/0093118 A1 Jul. 18, 2002

(30) Foreign Application Priority Data

Jan. 16, 2001 (JP) ........................................ 2001-008302

(51) Int. Cl.$^7$ ................................................ B29B 7/24
(52) U.S. Cl. ...................... 366/76.4; 366/76.6; 366/81; 366/85; 366/90
(58) Field of Search ............................... 366/76.3, 76.4, 366/76.6, 81, 84–86, 88–90, 297–301, 319, 322–324; 425/204, 208, 209

(56) References Cited

U.S. PATENT DOCUMENTS

| | | | |
|---|---|---|---|
| 3,154,808 A | * 11/1964 | Ahlefeld, Jr. et al. | 366/76.6 |
| 3,941,535 A | * 3/1976 | Street | 425/208 |
| 4,695,165 A | 9/1987 | Fukumizu et al. | 366/90 |
| 5,499,870 A | * 3/1996 | Rockstedt | 366/85 |
| 5,590,959 A | 1/1997 | Ueda et al. | 366/84 |
| 5,851,065 A | * 12/1998 | Ikeda et al. | 366/76.6 |
| 5,947,593 A | 9/1999 | Inoue et al. | 366/85 |
| 5,984,516 A | 11/1999 | Inoue et al. | 366/85 |
| 6,106,142 A | * 8/2000 | Rockstedt | 366/85 |
| 6,170,975 B1 | * 1/2001 | Andersen | 366/82 |
| 2001/0019729 A1 | * 9/2001 | Inoue | 425/204 |

FOREIGN PATENT DOCUMENTS

EP         0 822 054      *   4/1998

* cited by examiner

Primary Examiner—Charles E. Cooley
Assistant Examiner—David Sorkin
(74) Attorney, Agent, or Firm—Oblon, Spivak, McClelland, Maier & Neustadt, P.C.

(57) ABSTRACT

A twin-screw continuous kneading apparatus is provided which can stably supply an additive without reducing the production capability and greatly increase the throughput of a high-quality compound. The kneading apparatus includes a second supply unit connected to an upstream end or a midstream portion of a barrel and supplying an additive into kneading chambers, and has a kneading zone provided by a part of each of kneading screws downstream of the second supply unit for mixing the additive into a kneaded material. The kneading zone is constituted by a segment group made up of a plurality of rotor segments arranged successively in an axial direction of the kneading screw, the segment group satisfying conditions (a) the segment group comprises only feed segments having flights twisted in a direction to feed the kneaded material downstream with rotation of the kneading screw, or comprises the feed segments and neutral segments having flights parallel to the axial direction, and (b) each of the rotor segments making up the segment group has flights formed by arranging a high-height tip portion providing a comparatively small tip clearance relative to an inner wall surface of the kneading chamber and a low-height tip portion providing a comparatively large tip clearance alternately in the axial direction in succession.

16 Claims, 6 Drawing Sheets

FIG. 4A
FIG. 4B
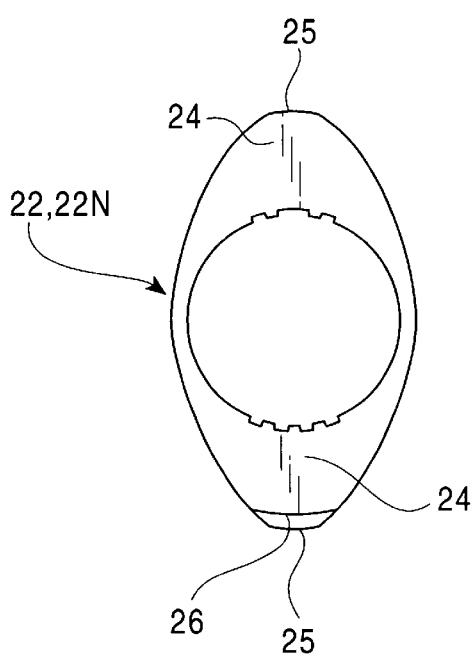
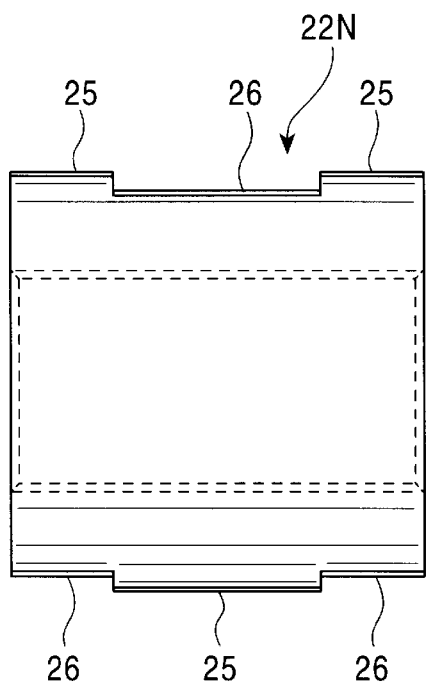

TWIN-SCREW CONTINUOUS KNEADING APPARATUS AND KNEADING METHOD USING THE SAME

BACKGROUND OF THE INVENTION

1. Field of the Invention

The present invention relates to a twin-screw continuous kneading apparatus suitable for efficiently kneading high-polymer resin materials, such as plastic and rubber mixed with additives, to obtain a plastic compound and a rubber compound. The present invention also relates to a kneading method using the twin-screw continuous kneading apparatus.

2. Description of the Related Art

Generally, composite resin materials, such as a plastic compound and a rubber compound, are produced by supplying a powdery additive, such as talc, into a barrel of a kneading extruder, and extruding a high-polymer resin material to be kneaded downstream using a kneading screw, which is inserted in the barrel, while kneading the high-polymer resin material together with the additive. The extruded material is then shaped into products by a post-treating apparatus such as a granulating machine.

A twin-screw continuous kneading apparatus for producing such composite resin materials comprises a barrel having a pair of left and right kneading chambers formed therein in communication with each other, a pair of left and right kneading screws rotatably inserted in the kneading chambers, a first supply unit constituted by, e.g., a screw feeder connected to the upstream end of the barrel and supplying a material to be kneaded into the kneading chambers, and a second supply unit constituted by, e.g., a side feeder connected to a midstream portion of the barrel and supplying an additive into the kneading chambers. A kneading zone for kneading and mixing the additive into the kneaded material is defined along the kneading screws in an area downstream of the second supply unit.

In the kneading zone, rotor segments each having a tip clearance, which allows the kneaded material to positively pass through it, are employed so that high shearing forces are imparted to the kneaded material even under low temperatures. Also, to control a filling rate of the material, a plurality of kneading disks having phases shifted in a direction to push back the material or screw segments having flights twisted in a direction to push back the material are usually provided in the kneading zone.

However, providing those kneading disks or screw segments acting to push back the resin flow in the kneading zone immediately downstream of a point, at which the additive is added to the resin material, may cause the problem in that the filling rate of the material is locally increased in the kneading zone to such an extent as impeding a gas purge toward the downstream side, and the additive cannot be supplied through the side feeder any more. In that event, the feeding capability is reduced and the stable operation is no longer continued.

One conceivable method for overcoming the above-mentioned problem is to construct the kneading zone, which is positioned immediately downstream of the addition point of the additive, only by rotor segments having flights twisted in a direction to feed the resin material without providing the kneading disks and the screw segments.

However, the tip clearance of the rotor segment is set, as mentioned above, to be comparatively larger than those of other kneading segments. Accordingly, if the kneading zone positioned immediately downstream of the addition point of the additive is entirely constructed using such conventional rotor segments, the kneaded material passing through the tip clearances is more likely to adhere to inner wall surfaces of the kneading chambers in the form of layers and to reduce the effective diameter of each kneading chamber. This may result in a reduced throughput and insufficient kneading of the resin material with the mixed additive.

Also, employing the kneading zone, in which the rotor segments having the tip clearances comparatively larger than those of other kneading segments are successively arranged, raises another problem in that a kneading screw is more susceptible to a mechanical damage because of an increased deflection during the rotation thereof, and the kneading screw cannot be rotated at high speeds. This also impedes an improvement of the throughput.

The above-described problems arise not only in the case of mixing a powdery additive into a material to be kneaded, but also in the case in which the material to be kneaded is itself a powdery material having a very small bulk density.

SUMMARY OF THE INVENTION

In view of the state of the art set forth above, it is an object of the present invention to provide a twin-screw continuous kneading apparatus and a kneading method using the twin-screw continuous kneading apparatus, which can stably supply a powdery additive or a powdery material to be kneaded without reducing the production capability, and can greatly increase the throughput of a high-quality compound.

To achieve the above object, a twin-screw continuous kneading apparatus according to the present invention comprises a barrel having a pair of kneading chambers formed therein in communication with each other; a pair of kneading screws rotatably inserted in the kneading chambers; a first supply unit connected to an upstream end portion of the barrel and supplying a material to be kneaded into the kneading chambers; a second supply unit connected to the upstream end portion or a midstream portion of the barrel and supplying an additive into the kneading chambers; an additive feed zone provided by a part of each of the kneading screws corresponding to the second supply unit, the additive feed zone being made up of screw segments; a downstream feed zone provided by a part of each of the kneading screws downstream of the additive feed zone, the downstream feed zone being made up of screw segments; and an additive mixing zone provided by a part of each of the kneading screws downstream of the additive feed zone and between the additive feed zone and the downstream feed zone, the additive mixing zone being made up of rotor segments arranged successively in an axial direction of the kneading screw. A segment group constituting the additive mixing zone satisfies conditions (a) and (b) given below: (a) the segment group comprises only feed segments having flights twisted in a direction to feed the kneaded material downstream with rotation of the kneading screw, or comprises the feed segments and neutral segments having flights parallel to the axial direction of the kneading screw, and (b) each of the rotor segments making up the segment group has flights formed by arranging a high-height tip portion providing a comparatively small tip clearance relative to an inner wall surface of the kneading chamber and a low-height tip portion providing a comparatively large tip clearance alternately in the axial direction in succession.

With the arrangement set forth above, the segment group constituting the additive mixing zone, which is made up of a plurality of rotor segments arranged successively in the axial direction of the kneading screw, comprises only the feed segments or comprises the feed segments and the neutral segments. Thus, any segments, which develop an action to push back a flow of resin (kneaded material) upstream, are not present in the additive mixing zone. It is therefore possible to prevent the filling rate of the kneaded material from being locally increased in the additive mixing zone to such an extent that degassing toward the downstream side would be impeded. As a result, the feeding capability is avoided from deteriorating due to reduced supply of the additive from the second supply unit, and hence the stable operation is ensured.

Also, with the above arrangement, the flights of each rotor segment of the segment group constituting the additive mixing zone are formed by arranging the high-height tip portion providing the comparatively small tip clearance relative to the inner wall surface of the kneading chamber and the low-height tip portion providing the comparatively large tip clearance alternately in the axial direction in succession. Therefore, mixing of the additive into the kneaded material is accelerated when the kneaded material passes through the comparatively large tip clearance provided by the low-height tip portion. In addition, even if the kneaded material adheres to the inner wall surfaces of the kneading chambers when passing through the comparatively large tip clearance provided by the low-height tip portion, the adhered kneaded material is scraped off from the inner wall surfaces of the kneading chambers by the high-height tip portion that provides the comparatively small tip clearance. It is hence possible to prevent the effective diameter of each kneading chamber from being reduced due to adhering of the kneaded material in the form of a layer onto the inner wall surface of the kneading chamber, while improving the effect of mixing the additive into the kneaded material. As a result, the throughput of a compound can be greatly improved.

In the present invention, the rotor segments making up the segment group of the kneading zone may be each of the three-flight type having three projected flights, or of the two-flight type having a pair of flights radially projecting in opposite directions. From the viewpoint of increasing the throughput, the two-flight type is more preferable because it is able to provide a larger effective cross-sectional area in the kneading chamber.

As compared with the three-flight rotor segment, the two-flight one has a smaller transverse cross-sectional area, generates a relatively large deflection during rotation at high speeds, and is more susceptible to a mechanical damage. Using the two-flight rotor segment, therefore, accompanies a contradiction that, in spite of providing a larger effective cross-sectional area in the kneading chamber, the two-flight rotor segment cannot improve the throughput to such an extent as expected, because the kneading screw cannot be rotated at high speeds.

In the present invention, therefore, when each of the rotor segments making up the segment group is of the two-flight type having a pair of flights radially projecting in opposite directions, the flights are preferably located such that in an axial range where one of the flights is formed as the high-height tip portion, the other flight is formed as the low-height tip portion, and in an axial range where one of the flights is formed as the low-height tip portion, the other flight is formed as the high-height tip portion.

With that arrangement, since both of the paired flights are never formed as the low-height tip portions in any axial range, a reduction in cross-sectional area of the rotor segment caused by the formation of the low-height tip portions is minimized. Consequently, the rotor segment is less susceptible to a mechanical damage even with the kneading screw rotated at high speeds, and the rotational speed of the kneading screw can be increased in spite of using the two-flight rotor segment. The throughput of a compound can be hence improved.

In the present invention, preferably, the pair of kneading screws are of the meshing type in which flights of the kneading screws mesh with each other inside the barrel.

With that arrangement, one of the kneading screws scrapes off the kneaded material in a molten state from the other to prevent the kneaded material from remaining adhered to each kneading screw. As a result, the kneaded material can be avoided from residing too long in the kneading chambers and from deteriorating.

In the present invention, preferably, all of the rotor segments making up the segment group constituting the additive mixing zone have the same cross-sectional form except for the tip portions and are joined to each other continuously such that no steps are produced between every adjacent rotor segments in the axial direction.

When employing the kneading screws of the meshing type, if the rotor segments making up the segment group constituting the additive mixing zone have much different cross-sectional forms or they are joined to each other discontinuously, a flow of the kneaded material would be impeded by steps produced at joints between the adjacent segments, and the kneaded material would be more likely to reside too long in the kneading chambers. Those drawbacks can be eliminated with the above arrangement.

In the present invention, preferably, a tip clearance provided by the low-height tip portion is set to a range of 0.015D to 0.150D, and a tip clearance provided by the high-height tip portion is set to a range of 0.001D to 0.020D, in which D is an inner diameter of the kneading chamber. By so setting the tip clearances, the additive can be effectively mixed into the kneaded material.

Further, the kneading apparatus of the present invention may be constructed such that the second supply unit is connected to the midstream portion of the barrel, the apparatus further comprises a kneaded material feed zone provided by a part of each of the kneading screws corresponding to the first supply unit, the kneaded material feed zone being made up of screw segments, and each of the kneading screws includes a first kneading zone located between the kneaded material feed zone and the additive feed zone and kneading the material to be kneaded, which is supplied by the first supply unit.

As an alternative, the kneading extruder may be modified such that the second supply unit is connected to the upstream end portion of the barrel, and the additive feed zone serves also as a feed zone for the material to be kneaded, which is supplied by the first supply unit.

The kneading extruder may further comprise a gate device having a pair of upper and lower gate plates, which are movable toward and away from the kneading screws, the gate device being located at a downstream end of the additive mixing zone.

In addition, the present invention provides a kneading method using a twin-screw continuous kneading apparatus, wherein an additive supplied by the second supply unit is mixed in the additive mixing zone into a material to be kneaded, which is supplied by the first supply unit.

The kneading method of the present invention may be applied to production of a composite resin material such as a plastic compound or a rubber compound. In such a case, preferably, the kneaded material supplied by the first supply unit is in the form of pellets made of a synthetic resin, and the additive supplied by the second supply unit is an additive made of a reinforcement powder.

According to another aspect, the present invention provides a twin-screw continuous kneading apparatus comprising a barrel having a pair of kneading chambers formed therein in communication with each other; a pair of kneading screws rotatably inserted in the kneading chambers; a first supply unit connected to an upstream end portion of the barrel and supplying a material to be kneaded into the kneading chambers; a first feed zone provided by a part of each of the kneading screws corresponding to the first supply unit, the first feed zone being made up of screw segments; a downstream feed zone provided by a part of each of the kneading screws downstream of the first feed zone, the downstream feed zone being made up of screw segments; and a first kneading zone provided by a part of each of the kneading screws downstream of the first feed zone and between the first feed zone and the downstream feed zone, the first kneading zone being made up of rotor segments arranged successively in an axial direction of the kneading screw, wherein a segment group constituting the first kneading zone satisfies conditions (a) and (b) given below: (a) the segment group comprises only feed segments having flights twisted in a direction to feed the kneaded material downstream with rotation of the kneading screw, or comprises the feed segments and neutral segments having flights parallel to the axial direction of the kneading screw, and (b) each of the rotor segments making up the segment group has flights formed by arranging a high-height tip portion providing a comparatively small tip clearance relative to an inner wall surface of the kneading chamber and a low-height tip portion providing a comparatively large tip clearance alternately in the axial direction in succession.

The present invention is applicable to not only the case of mixing a powdery additive into a material to be kneaded, but also a twin-screw continuous kneading apparatus for handling the material to be kneaded, which is itself a powdery material having a small bulk density, and a kneading method implemented using the kneading extruder. In the latter case, the provision of the second supply unit constituted by, e.g., a side feeder is not necessarily required.

BRIEF DESCRIPTION OF THE DRAWINGS

FIG. 4A is a front view of a neutral segment, and FIG. 4B is a side view of the neutral segment;

DESCRIPTION OF THE PREFERRED EMBODIMENTS

Preferred embodiments of the present invention will be described below with reference to the drawings.

FIGS. 1 to 4 show a twin-screw continuous kneading extruder according to a first embodiment of the present invention.

Figure 1:
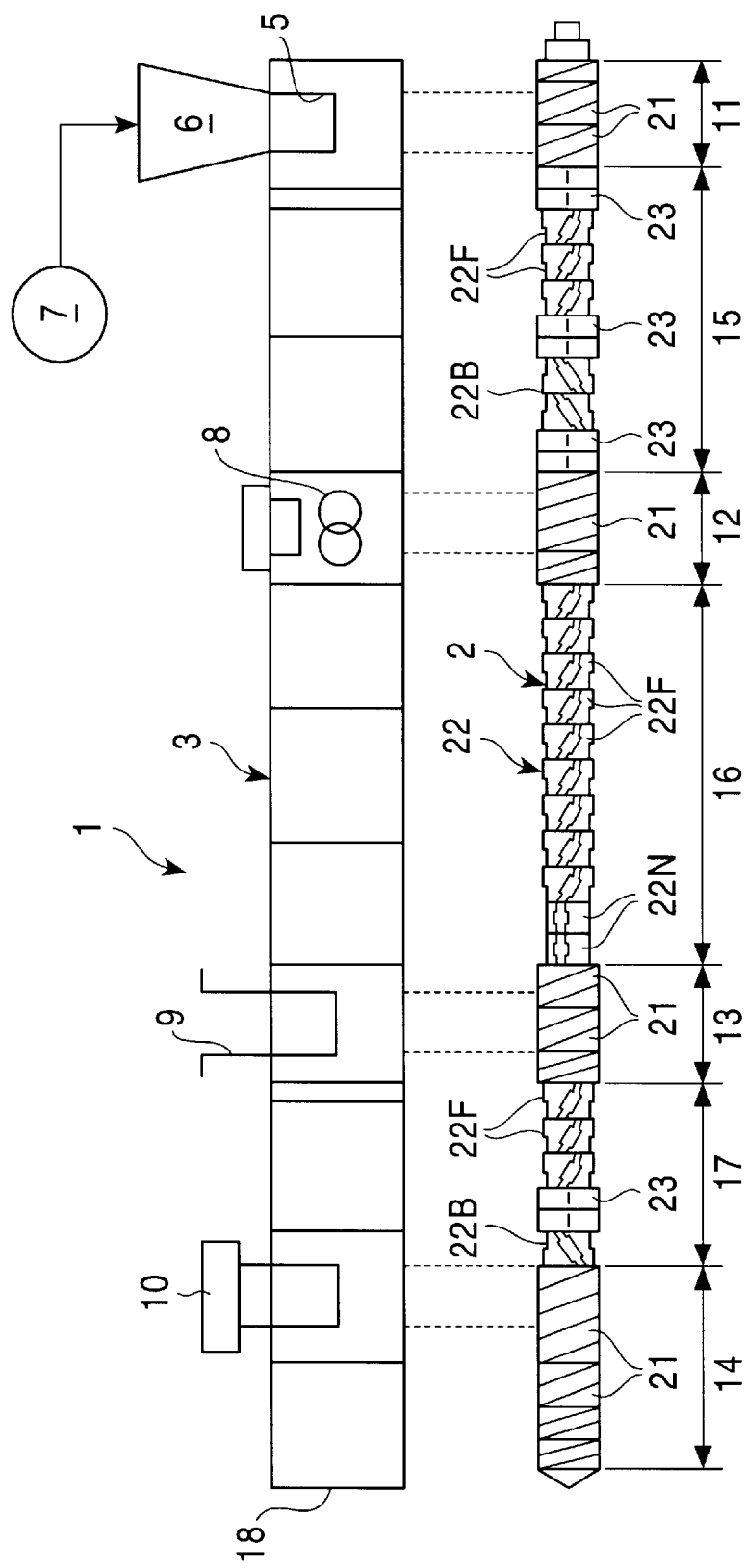
FIG. 1 is a schematic view showing a construction of a twin-screw continuous kneading extruder according to a first embodiment of the present invention.

As shown in FIG. 1, a kneading extruder 1 of the first embodiment comprises a pair of left and right kneading screws 2, 2, and a barrel 3 rotatably supporting the pair of kneading screws 2, 2. The barrel 3 used in the first embodiment is of the division type comprising a plurality of barrel segments connected successively in the axial direction. A cooling pipe (not shown) for cooling a material under kneading is joined to an outer wall surface of the barrel 3.

Inside the barrel 3, a pair of left and right kneading chambers 4, 4 are formed so as to penetrate the barrel 3 in the axial direction from the upstream side (right side in FIG. 1) to the downstream side (left side in FIG. 1). At the upstream end of the barrel 3, a material supply port 5 is formed for supplying a material to be kneaded, such as rubber and plastic, to the pair of kneading chambers 4, 4. A first supply unit (means) 7 for the kneaded material, which is in the form of, for example, a screw feeder, is provided in association with a hopper 6 connected to the supply port 5.

Also, in an intermediate portion of the barrel 3 at a position slightly shifted upstream, a second supply unit (means) 8 is provided for supplying a reinforcement powder, such as talc, into the kneading chambers 4. The second supply unit 8 used in this first embodiment is constituted by a side feeder connected to a lateral side of the barrel 3 and having a feed screw rotatably disposed therein. Further, in an intermediate portion of the barrel 3 at a position slightly shifted downstream, an open vent 9 is provided so as to communicate the interiors of the kneading chambers 4 with open air for degassing. At a position downstream of the open vent 9, a vacuum vent 10 is provided to evacuate the interiors of the kneading chambers 4 under vacuum.

As shown in FIG. 1, the pair of kneading screws 2, 2 are each made up of total four feed zones 11 to 14 and total three kneading zones 15 to 17, which are arranged alternately in the axial direction. Of those zones, the first feed zone 11 located at the most upstream side is arranged to cover a range substantially corresponding to the barrel segment, to which the first supply unit 7 is connected, and the first kneading zone 15 is arranged to cover a range from the downstream end of the first feed zone 11 to a position just upstream of the second supply unit 8.

The second feed zone 12 is arranged to cover a range substantially corresponding to the barrel segment, to which the second supply unit 8 is connected, and the second kneading zone 16 is arranged to cover a range from the downstream end of the second feed zone 12 to a position just upstream of the open vent 9. Further, the third feed zone 13 is arranged to cover a range substantially corresponding to the barrel segment, in which the open vent 9 is formed, and the third kneading zone 17 is arranged to cover a range from the downstream end of the third feed zone 13 to a position just upstream of the vacuum vent 10. The fourth feed zone 14 located at the most downstream side is arranged to cover a range from the barrel segment, in which the vacuum vent 10 is provided, to a material discharge port 18 formed at the downstream end of the barrel 3.

Figure 2:
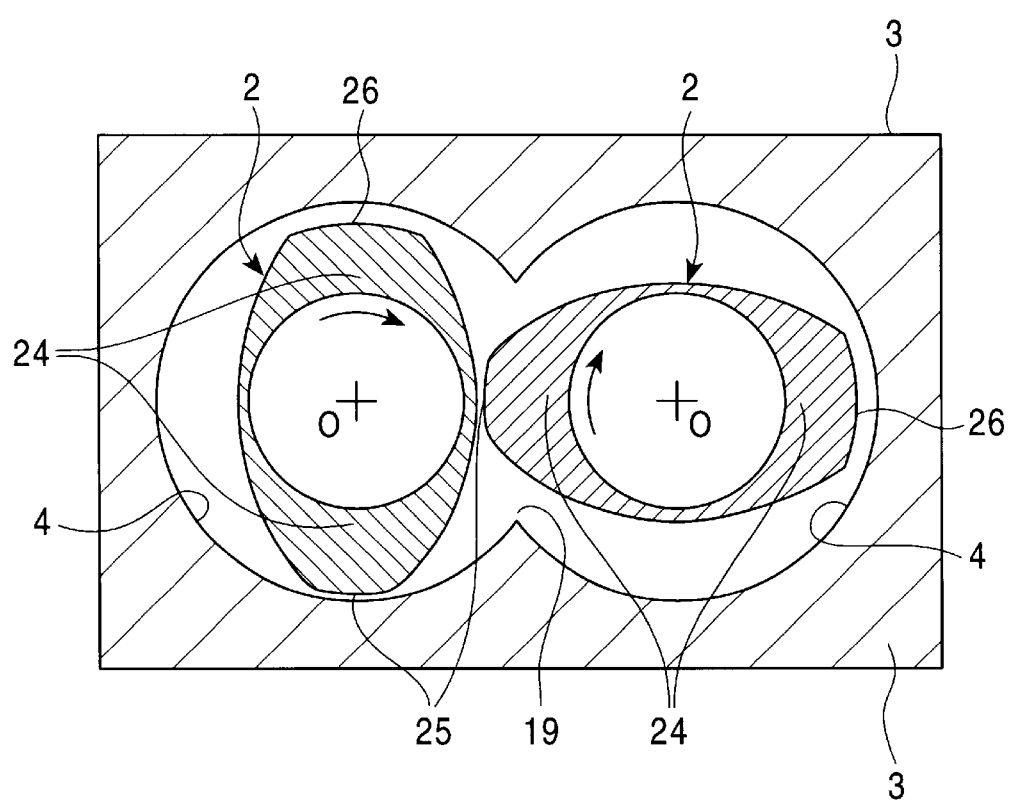
FIG. 2 is an enlarged transverse cross-sectional view of the kneading extruder.

As shown in FIG. 2, the pair of the kneading chambers 4, 4 are formed to have substantially circular transverse cross-sections, which are partly overlapped with each other in a communicating portion 19 at the center of the barrel 3 so that the interior of the barrel 3 is hollowed in the form like a pair of spectacle lenses. The kneading screws 2 are rotatably inserted in the kneading chambers 4 in a one-to-one relation.

The pair of kneading screws 2, 2 are arranged with their axes extending parallel to each other, and are coupled to a driving mechanism (not shown) outside the barrel 3 for rotation in the same direction. The centers (axes) O of rotation of the kneading screws 2 rotated by the driving mechanism are aligned respectively with the centers of the kneading chambers 4 inside the barrel 3. Note that the center of the kneading chamber 4 means a midpoint located at equal distances from an inner wall surface of the kneading chamber 4 formed in substantially circular transverse cross-section.

Each kneading screw 2 is made up of three types of segments, i.e., a two-flight screw segment 21 for feeding the kneaded material while pushing it downstream, a two-flight rotor segment 22 for intermixing and dispersing the kneaded material, and a two-flight kneading disk segment 23 for primarily intermixing the kneaded material.

The pair of left and right kneading screws 2, 2 used in this first embodiment are of the meshing type having flights arranged so as to mesh with each other inside the barrel 3. During the rotation, therefore, one of the kneading screws 2 scrapes off the kneaded material in a molten state from the other to prevent the kneaded material from remaining adhered to each kneading screw. As a result, the kneaded material can be avoided from residing too long in the kneading chambers 4 and from deteriorating.

Of the three types of segments, the screw segment 21 has a pair of flights radially projecting in opposite directions about the center O of rotation. The flights are spirally twisted while extending in the axial direction with very small tip clearances left relative to the inner wall surface of the kneading chamber 4. The feed zones 11 to 14 are each constituted by joining a plurality of screw segments 21 successively such that the flights of the adjacent screw segments 21 are located in continuation with each other. Therefore, the feed zone has the function of feeding the kneaded material downstream through grooves defined between the flights of the screw segments 21, but not the function of kneading the material to be kneaded.

The kneading disk segment 23 is constituted by joining a plurality of kneading disks in the form of flat plates to each other. Each kneading disk is of the two-flight type having a pair of flights in the same cross-section as the flights of the screw segment 21 with very small tip clearances, but extending parallel to the axial direction. Therefore, the kneaded material having entered the kneading disk segment 23 is subjected to high shearing forces and sufficiently kneaded while passing through the very small tip clearances defined by the flight tips.

Figure 3A:
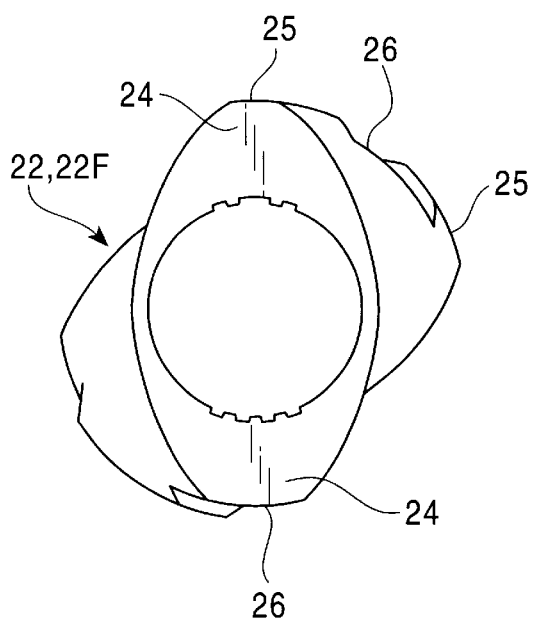
FIG. 3A is a front view of a feed segment.
Figure 3B:
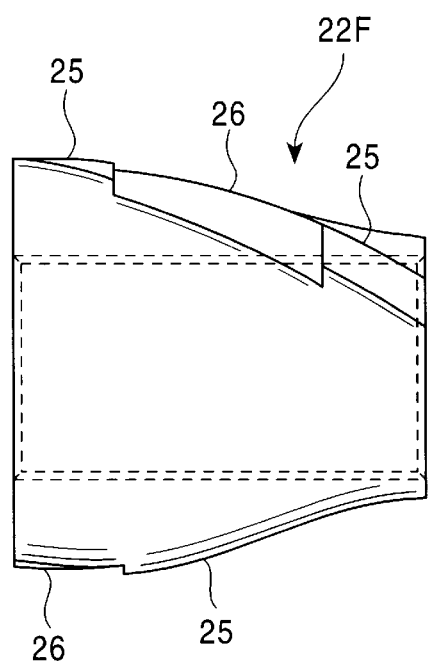
FIG. 3B is a side view of the feed segment.

In this first embodiment, the rotor segment 22 is constituted using any one of three types of segments, i.e., a feed segment 22F, a neutral segment 22N, and a pushback segment 22B. Of those three types of segments, as shown in FIGS. 3A and 3B, the feed segment 22F has a pair of flights 24 spirally twisted while extending in the axial direction so as to advance the kneaded material downstream, and hence has the function of increasing the production capability by kneading the material to be kneaded while positively feeding the kneaded material.

Also, as shown in FIGS. 4A and 4B, the neutral segment 22N has a pair of flights 24 extending parallel to the axial direction so that the kneaded material is urged neither downstream nor upstream. Thus, the neutral segment 22N has the function of increasing a degree of kneading of the kneaded material as compared with the feed segment 22F because the neutral segment 22N has no function of feeding the kneaded material.

Further, the pushback segment 22B is formed into a shape resulting from twisting the flights 24 of the feed segment 22F, shown in FIG. 3, just in an opposite direction. Therefore, the pushback segment 22B has the function of kneading the material to be kneaded while pushing back it upstream, thereby raising a filling rate of the kneaded material in the kneading chambers 4 and increasing a degree of kneading of the kneaded material.

As shown in FIGS. 2 to 4, the flights 24 of each rotor segment 22 (feed, neutral or pushback segment 22F, 22N, 22B) are formed by arranging a high-height tip portion 25, which provides a comparatively small tip clearance relative to the inner wall surface of the kneading chamber 4, and a low-height tip portion 26, which provides a comparatively large tip clearance relative to the inner wall surface of the kneading chamber 4, alternately in the axial direction in succession. Of those two types of tip portions 25 and 26, the high-height tip portion 25 has the function of imparting greater shearing forces to the kneaded material while allowing a part of the kneaded material to pass through the comparatively small tip clearance when the kneading screw 2 is rotated, and also has the function of scraping off a surface layer of the kneaded material adhering to the inner wall surface of the kneading chamber 4.

On the other hand, the low-height tip portion 26 projects in the radial direction to a smaller extent so as to provide a larger tip clearance than that provided by the high-height tip portion 25. Accordingly, the low-height tip portion 26 has the function of imparting smaller shearing forces to the kneaded material while allowing the kneaded material to pass through the larger tip clearance in an increased amount when the kneading screw 2 is rotated, thereby accelerating a flow of the kneaded material in the kneading chamber 4 and increasing a degree of mixing of the kneaded material, and also has the function of avoiding the kneaded material from being locally subjected to great shearing forces and suppressing an excessive temperature rise of the kneaded material.

In this first embodiment, the tip clearance provided by the low-height tip portion 26 is set to a range of 0.015D to 0.150D for realizing effective mixing of the additive into the kneaded material, and the tip clearance provided by the high-height tip portion 25 is set to a range of 0.001D to 0.020D for effectively scraping off the kneaded material from the inner wall surface of the kneading chamber. Here, D is the inner diameter of the kneading chamber 4 in the barrel 3. Also, a twisting angle of the flights 24 of the feed segment 22F (FIG. 4) is set to about 30 degrees with respect to the axial direction. Conversely, a twisting angle of the flights of the pushback segment 22B is set to about −30 degrees with respect to the axial direction.

Further, in the kneading screw shown in FIG. 1, the rotor segments 22F, 22N and 22B constituting segment groups of the kneading zones 15, 16, 17 are illustrated as being joined discontinuously to the adjacent rotor segment. In fact, however, all of the rotor segments 22F, 22N and 22B have the same cross-sectional form except for the tip portions and are joined to each other continuously such that no steps (surface level differences) are produced between every adjacent rotor segments in the axial direction.

In this first embodiment employing the kneading screws 2 of the meshing type, therefore, the rotor segments 22F, 22N and 22B constituting the segment groups of the kneading zones 15, 16, 17 are free from steps at joints between the adjacent segments, which would occur if the rotor segments have cross-sectional shapes differing from each other to a large extent or they are joined discontinuously. As a result, it is possible to effectively prevent deterioration of the kneaded material that would be caused if the flow of the kneaded material is impeded and the material resides too long in the barrel.

As shown in FIGS. 3 and 4, each rotor segment 22 (feed, neutral or pushback segment 22F, 22N, 22B) is of the two-flight type having a pair of flights 24 radially projecting in opposite directions. In an axial range where one of the flights 24 is formed as the high-height tip portion 25, the other flight 24 is formed as the low-height tip portion 26. Conversely, in an axial range where one of the flights 24 is formed as the low-height tip portion 26, the other flight 24 is formed as the high-height tip portion 25.

Of the above-mentioned three types of kneading zones 15 to 17, as shown in FIG. 1, the first kneading zone 15 for only kneading the material to be kneaded is constructed by arranging the kneading disk segments 23, the feed segments 22F, the kneading disk segments 23, the pushback segments 22B, and the kneading disk segments 23 successively in the axial direction in that order from the upstream side. The third kneading zone 17 at the most downstream side is constructed by arranging the feed segments 22F, the kneading disk segments 23, and the pushback segment 22B successively in the axial direction in that order from the upstream side.

On the other hand, the second kneading zone 16 for kneading the material to be kneaded in a range just downstream of the second supply unit 8, which supplies the additive, is constructed by arranging total nine feed segments 22F successively in the axial direction, and then joining two neutral segments 22N to the most downstream one of the nine feed segments 22F. The kneading disk segment 23 and the pushback segment 22B, which tend to increase the filling rate of the kneaded material in the kneading chambers, are not employed in the second kneading zone 16.

The operation of the twin-screw continuous kneading extruder 1 having the above construction will be described below.

When producing composite resin materials, such as a plastic compound and a rubber compound, with the kneading extruder 1, a material to be kneaded in the form of, e.g., pellets made of a synthetic resin is first supplied by the first supply unit 7 to the hopper 6 at the upstream end of the barrel 3. The kneaded material is fed downstream from the first feed zone 11 to the first kneading zone 15 in which the material is primarily kneaded and melted.

Then, the resin material having been primarily kneaded reaches the second feed zone 12 just upstream of the second kneading zone 16. In the second feed zone 12, an additive made of a reinforcement powder is supplied to the kneading chambers 4 through the second supply unit 8 provided in the midstream portion of the barrel 3 corresponding to the second feed zone 12. The supplied additive is mixed into the resin material while the resin material is secondarily kneaded in the second kneading zone 16.

The kneaded material including the additive mixed therein is degassed when passing the open vent 9 and is introduced to the third kneading zone 17 for tertiary kneading. Then, the kneaded material is forcibly degassed and dehydrated in the fourth feed zone 14 when passing the vacuum vent 10, and is sent to an external post-treating apparatus through the discharge port 18.

With the twin-screw continuous kneading extruder 1 of this first embodiment, the group of segments making up the second kneading zone 16 for mixing the additive into the resin material is constituted by arranging the neutral segments 22N in addition to the feed segments 22F. And neither the pushback segment 22B nor the kneading disk segment 23, which develop an action to push back the resin flow upstream, are provided in the second kneading zone 16. It is therefore possible to prevent the filling rate of the kneaded material from being locally increased in the second kneading zone 16 to such an extent that degassing toward the downstream side would be impeded. As a result, the feeding capability is avoided from deteriorating due to insufficient supply of the additive from the second supply unit 8, and hence the stable operation is ensured.

Also, with the kneading extruder 1 of this first embodiment, the flights 24 of each of the rotor segments 22F, 22N are formed by arranging the high-height tip portion 25 and the low-height tip portion 26 alternately in the axial direction in succession. Therefore, mixing of the additive into the kneaded material is accelerated when the kneaded material passes through the comparatively large tip clearance provided by the low-height tip portion 26. In addition, even if the kneaded material adheres to the inner wall surfaces of the kneading chambers 4 when passing through the comparatively large tip clearance provided by the low-height tip portion 26, the adhered kneaded material is scraped off from the inner wall surfaces of the kneading chambers 4 by the high-height tip portion 25 that provides the comparatively small tip clearance. It is hence possible to prevent the effective diameter of each kneading chamber from being reduced due to adhering of the kneaded material in the form of a layer onto the inner wall surface of the kneading chamber, while improving the effect of mixing the additive into the kneaded material. As a result, the throughput of a compound can be greatly improved.

Furthermore, with the kneading extruder 1 of this first embodiment, the two-flight rotor segments 22 making up the second kneading zone 16 are each constructed such that in an axial range where one of the flights 24 is formed as the high-height tip portion 25, the other flight 24 is formed as the low-height tip portion 26, and in an axial range where one of the flights 24 is formed as the low-height tip portion 26, the other flight 24 is formed as the high-height tip portion 25. In other words, both of the paired flights 24 are never formed as the low-height tip portions 26 in any axial range, and a reduction in cross-sectional area of the rotor segment 22 caused by the formation of the low-height tip portions 26 is minimized. Consequently, the rotor segment 22 is less susceptible to a mechanical damage even with the kneading screw 2 rotated at high speeds, and the throughput of a compound can be improved by increasing the rotational speed of the kneading screw 2 in spite of using the two-flight rotor segment 22.

Figure 5:
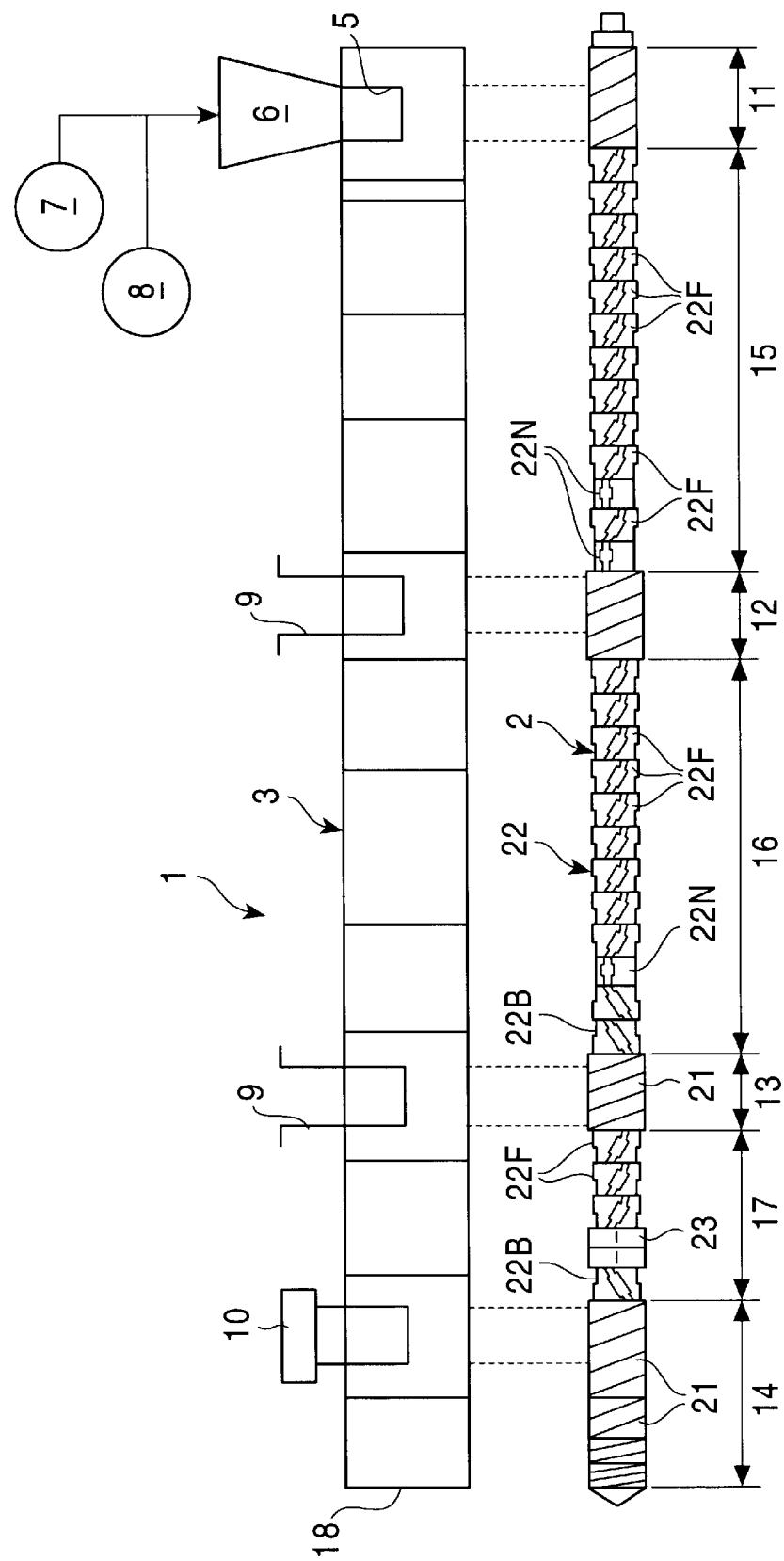
FIG. 5 is a schematic view showing a construction of a twin-screw continuous kneading extruder according to a second embodiment.

FIG. 5 schematically shows a twin-screw continuous kneading extruder 1 according to a second embodiment of the present invention.

The kneading extruder 1 of this second embodiment differs from that of the first embodiment in that a second supply unit 8 for an additive is constituted by a screw feeder connected to the hopper 6 that is provided at the upstream end of the barrel 3, and the additive is supplied into the kneading chambers 4 of the barrel 3 together with a material to be kneaded at the beginning of supply thereof.

In this second embodiment, therefore, the additive is mixed into the material to be kneaded in the first kneading zone 15 where the kneaded material is melted by primary kneading. For that reason, a segment group constituting the first kneading zone 15 comprises the feed segments 22F and the neutral segments 22N. On the other hand, the pushback segment 22B and the kneading disk segment 23 are employed in segment groups constituting the second kneading zone 16 and the third kneading zone 17 both located downstream of the first kneading zone 15.

Since the other construction of this second embodiment is substantially the same as that of the first embodiment, components having the same structures and functions as those in the first embodiment are denoted by the same characters in FIG. 5 and a redundant description thereof is omitted here.

Figure 6:
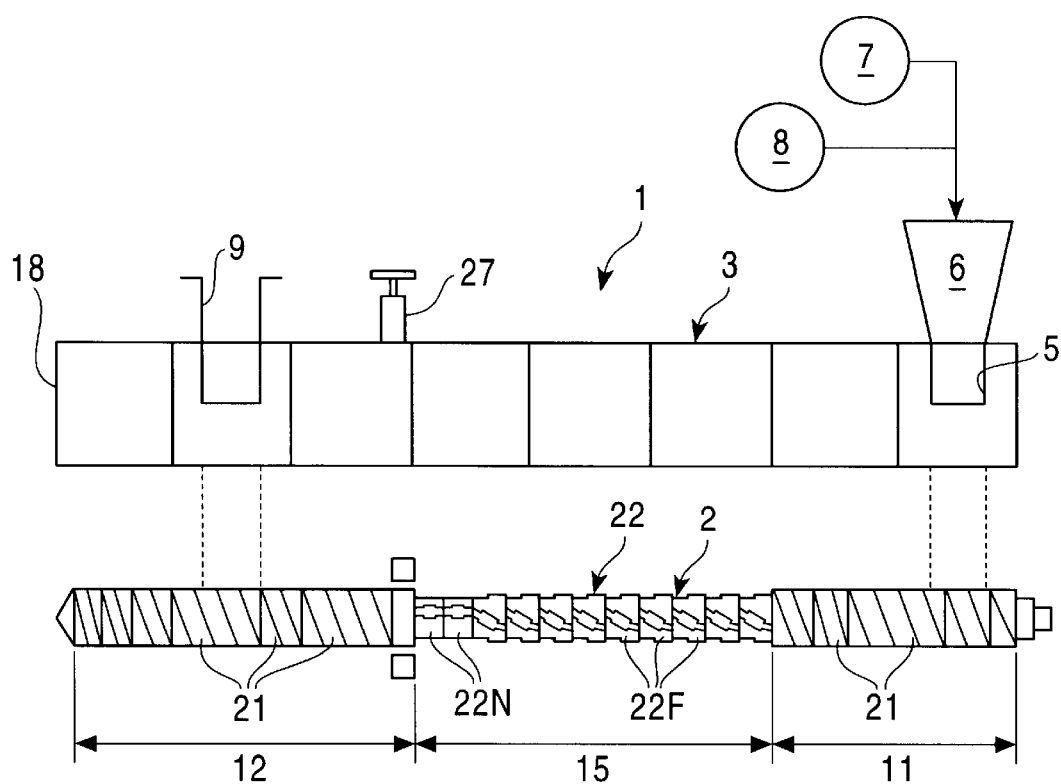
FIG. 6 is a schematic view showing a construction of a twin-screw continuous kneading extruder according to a third embodiment.

FIG. 6 shows a twin-screw continuous kneading extruder 1 according to a third embodiment of the present invention.

In this third embodiment, a gate device 27 having a pair of upper and lower gate plates, which are movable toward and away from the kneading screws 2, is provided midway the barrel 3. The gate device 27 has the function of adjusting the filling rate of a material to be kneaded in a kneading zone 15 where the material is kneaded and melted while an additive is mixed into the kneaded material.

Additionally, in this third embodiment, only one kneading zone 15 is arranged upstream of the gate device 27. As with the second embodiment, therefore, the second supply unit 8 for the additive is connected to the hopper 6 that is provided at the upstream end of the barrel 3, and the additive is supplied into the kneading chambers 4 of the barrel 3 together with the kneaded material at the beginning of supply thereof.

It is to be noted that the present invention is not limited to the embodiments described above.

For example, while, in the illustrated embodiments, the neutral segment 22N is employed in the kneading zone for mixing the additive into the kneaded material, that kneading zone may be constituted by arranging only the feed segments 22F successively in the axial direction. Also, the present invention is applicable to a kneading extruder that employs three-flight kneading screws.

Furthermore, any of the above-described embodiments illustrates the case of mixing a powdery additive into a material to be kneaded. To that end, the kneading extruder 1 includes the second supply unit 8 for the additive, which is provided separately from the supply unit for the material to be kneaded. However, the present invention can also be applied to the case in which the material to be kneaded is itself a powdery material having a small bulk density and is melted under shearing forces developed by the rotor segments. In such a case, the provision of the second supply unit 8 for supplying the additive is not necessarily required.

Furthermore, any of the above-described embodiments illustrates extruders. However, the present invention can be applied to the other kind of twin-screws continuous kneading apparatus, for example, a twin-screw continuous kneader comprising rotors having a discharge section for scraping out a material radially outwards after kneaded.

According to the present invention, as described above, an additive can be stably supplied without reducing the production capability, and hence the throughput of a high-quality compound can be greatly improved.

What is claimed is:

1. A twin-screw continuous kneading apparatus comprising:
   a barrel having a pair of kneading chambers formed therein in communication with each other;
   a pair of kneading screws rotatably inserted in said kneading chambers;
   first supply means for supplying a material to be kneaded into said kneading chambers, said first supply means being connected to an upstream end portion of said barrel;
   second supply means for supplying an additive into said kneading chambers, said second supply means being connected to the upstream end portion or a midstream portion of said barrel;
   an additive feed zone provided by a part of each of said kneading screws corresponding to said second supply means, said additive feed zone being made up of screw segments;
   a downstream feed zone provided by a part of each of said kneading screws downstream of said additive feed zone, said downstream feed zone being made up of screw segments; and
   an additive mixing zone provided by a part of each of said kneading screws downstream of said additive feed zone and between said additive feed zone and said downstream feed zone, said additive mixing zone being made up of rotor segments arranged successively in an axial direction of said kneading screw,
   wherein a segment group constituting said additive mixing zone satisfies conditions (a) and (b) given below:
   (a) the segment group comprises only feed segments having flights twisted in a direction to feed the kneaded material downstream with rotation of said kneading screw, or comprises said feed segments and neutral segments having flights parallel to the axial direction of said kneading screw, and
   (b) each of said rotor segments making up the segment group has flights formed by arranging a high-height tip portion providing a comparatively small tip clearance relative to an inner wall surface of said kneading chamber and a low-height tip portion providing a comparatively large tip clearance alternately in the axial direction in succession.

2. The twin-screw continuous kneading apparatus according to claim 1, wherein the segment group constituting said additive mixing zone further satisfies a condition (c) given below:
   (c) each of said rotor segments making up the segment group is of the two-flight type having a pair of flights radially projecting in opposite directions and located such that in an axial range where one of said flights is formed as said high-height tip portion, the other flight is formed as said low-height tip portion, and in an axial range where one of said flights is formed as said low-height tip portion, the other flight is formed as said high-height tip portion.

3. The twin-screw continuous kneading apparatus according to claim 2, wherein said pair of kneading screws are of the meshing type in which flights of said kneading screws mesh with each other inside said barrel.

4. The twin-screw continuous kneading apparatus according to claim 2, wherein the segment group constituting said additive mixing zone further satisfies a condition (d) given below:
   (d) all of said rotor segments making up the segment group have the same cross-sectional form except for the tip portions and are joined to each other continuously such that no steps are produced between every adjacent rotor segments in the axial direction.

5. The twin-screw continuous kneading apparatus according to claim 2, wherein a tip clearance provided by said low-height tip portion is set to a range of 0.015D to 0.150D, and a tip clearance provided by said high-height tip portion is set to a range of 0.001D to 0.020D, in which D is an inner diameter of said kneading chamber.

6. The twin-screw continuous kneading apparatus according to claim 1, wherein said second supply means is connected to the midstream portion of said barrel, said extruder further comprises a kneaded material feed zone provided by a part of each of said kneading screws downstream of said first supply means, said kneaded material feed zone being made up of screw segments, and each of said kneading screws includes a first kneading zone located between said kneaded material feed zone and said additive feed zone and kneading the material to be kneaded, which is supplied by said first supply means.

7. The twin-screw continuous kneading apparatus according to claim 1, wherein said second supply means is connected to the upstream end portion of said barrel, and said additive feed zone serves also as a feed zone for the material to be kneaded, which is supplied by said first supply means.

8. The twin-screw continuous kneading apparatus according to claim 7, further comprising a gate device having a pair of upper and lower gate plates, which are movable toward and away from said kneading screws, said gate device being located at a downstream end of said additive mixing zone.

9. A kneading method using a twin-screw continuous kneading apparatus according to claim 1, wherein an additive supplied by said second supply means is mixed in said additive mixing zone into a material to be kneaded, which is supplied by said first supply means.

10. The kneading method according to claim 9, wherein said method is applied to production of a composite resin material such as a plastic compound or a rubber compound, the kneaded material supplied by said first supply means is in the form of pellets made of a synthetic resin, and the additive supplied by said second supply means is an additive made of a reinforcement powder.

11. A twin-screw continuous kneading apparatus comprising:
   a barrel having a pair of kneading chambers formed therein in communication with each other;
   a pair of kneading screws rotatably inserted in said kneading chambers;
   first supply means for supplying a material to be kneaded into said kneading chambers, said first supply means being connected to an upstream end portion of said barrel;
   a first feed zone provided by a part of each of said kneading screws corresponding to said first supply means, said first feed zone being made up of screw segments;
   a downstream feed zone provided by a part of each of said kneading screws downstream of said first feed zone, said downstream feed zone being made up of screw segments; and
   a first kneading zone provided by a part of each of said kneading screws downstream of said first feed zone and between said first feed zone and said downstream feed zone, said first kneading zone being made up of rotor segments arranged successively in an axial direction of said kneading screw,
   wherein a segment group constituting said first kneading zone satisfies conditions (a) and (b) given below:
   (a) the segment group comprises only feed segments having flights twisted in a direction to feed the kneaded material downstream with rotation of said kneading screw, or comprises said feed segments and neutral segments having flights parallel to the axial direction of said kneading screw, and
   (b) each of said rotor segments making up the segment group has flights formed by arranging a high-height tip portion providing a comparatively small tip clearance relative to an inner wall surface of said kneading chamber and a low-height tip portion providing a comparatively large tip clearance alternately in the axial direction in succession.

12. The twin-screw continuous kneading apparatus according to claim 11, wherein the segment group constituting said first kneading zone further satisfies a condition (c) given below:
   (c) each of said rotor segments making up the segment group is of the two-flight type having a pair of flights radially projecting in opposite directions and located such that in an axial range where one of said flights is formed as said high-height tip portion, the other flight is formed as said low-height tip portion, and in an axial range where one of said flights is formed as said low-height tip portion, the other flight is formed as said high-height tip portion.

13. The twin-screw continuous kneading apparatus according to claim 12, wherein said pair of kneading screws are of the meshing type in which flights of said kneading screws mesh with each other inside said barrel.

14. The twin-screw continuous kneading apparatus according to claim 12, wherein the segment group constituting said first kneading zone further satisfies a condition (d) given below;
   (d) all of said rotor segments making up the segment group have the same cross-sectional form except for the tip portions and are joined to each other continuously such that no steps are produced between every adjacent rotor segments in the axial direction.

15. The twin-screw continuous kneading apparatus according to claim 12, wherein a tip clearance provided by said low-height tip portion is set to a range of 0.015D to 0.150D, and a tip clearance provided by said high-height tip portion is set to a range of 0.001D to 0.020D, in which D is an inner diameter of said kneading chamber.

16. A kneading method using a twin-screw continuous kneading apparatus according to claim 11, wherein the kneaded material supplied by said first supply means is a powdery material to be kneaded.

* * * * *